G. BURESS.
GAS ENGINE STARTER.
APPLICATION FILED NOV. 18, 1909.
1,004,984.
Patented Oct. 3, 1911.
Fig-1-
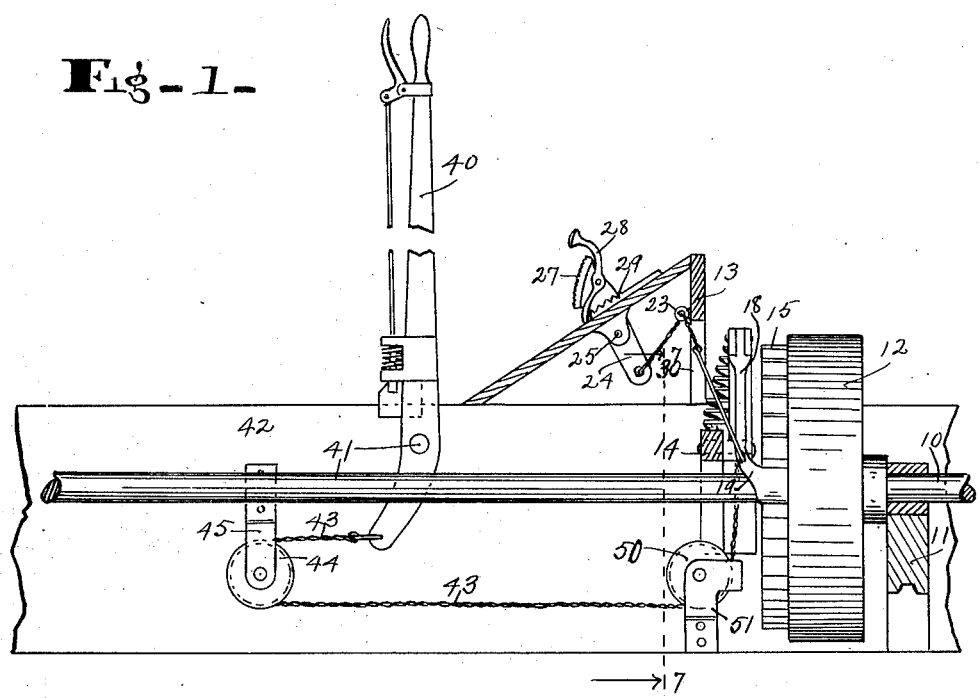
Fig-2-
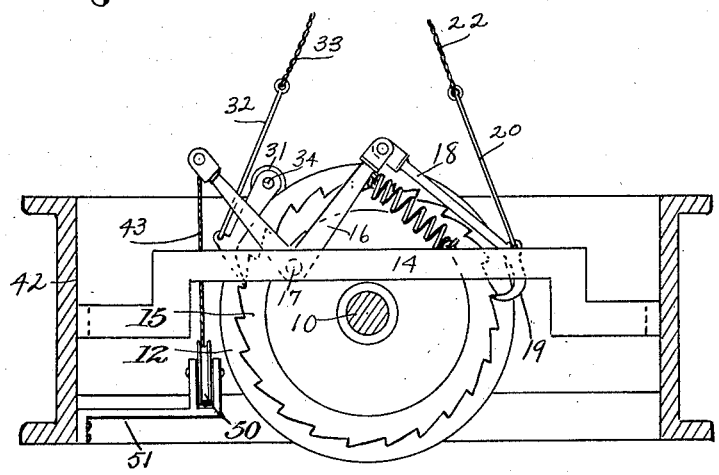
WITNESSES:
W. M. Gentle
O. M. McLaughlin
INVENTOR.
George Buress.
BY
V. H. Lockwood.
ATTORNEY.

UNITED STATES PATENT OFFICE.

GEORGE BURESS, OF INDIANAPOLIS, INDIANA, ASSIGNOR OF ONE-HALF TO ROBERT LONG, OF INDIANAPOLIS, INDIANA.

GAS-ENGINE STARTER.

1,004,984. Specification of Letters Patent. Patented Oct. 3, 1911.

Application filed November 18, 1909. Serial No. 528,690.

*To all whom it may concern:*

Be it known that I, GEORGE BURESS, of Indianapolis, county of Marion, and State of Indiana, have invented a certain new and useful Gas-Engine Starter; and I do hereby declare that the following is a full, clear, and exact description thereof, reference being had to the accompanying drawings.

The object of this invention is to improve the construction of mechanical starters for automobiles, and is particularly an improvement upon the devices shown in my prior application, Serial No. 485,581, filed March 25, 1909, and Patent No. 919,818, dated April 27, 1909.

The chief feature of the invention consists in mounting the starting mechanism in connection with the crank shaft, with the end of the crank shaft next to the dash-board of the vehicle so as to materially reduce the amount of mechanism required, as compared with the arrangement shown in my former patent and application.

Another feature consists in providing means for starting the engine by applying power to the fly-wheel for turning the engine shaft. In addition to the foregoing is the further idea of providing the fly-wheel with a ratchet wheel, and providing means operable from the seat of the vehicle for engaging the ratchet wheel, and through it giving the rotary movements to the fly wheel. There is also a further idea of means preferably controlled by a pedal for disengaging all parts from the fly wheel or the ratchet connected therewith while the machine is in normal operation.

The nature of the invention will be understood from the accompanying drawings and the following description and claims.

In the drawings Figure 1 is a vertical section of the forward portion of an automobile chassis, showing some parts in side elevation. Fig. 2 is a section on the line 7—7 of Fig. 1.

In the automobile herein shown 10 represents the engine shaft, being mounted at one point in a bearing 11 and carries a fly wheel 12 immediately in front of the dash-board 13, which is over the cross bar 14 in the chassis.

A ratchet wheel 15 is secured to the fly wheel 12, preferably on the side next to the seat of the automobile. On the bar 14 a bell-crank 16 is pivotally mounted at 17. One arm of the bell crank is pivoted to a pawl 18. Said pawl has an engaging end 19 adapted to reach down on the sides of the ratchet wheel and engage the teeth thereof. This pawl may be pulled entirely out of engagement with the ratchet wheel by the link 20 of the cable 22, which laterally runs through the eye 23 on the dash-board 13 and is connected with the pedal lever 24 fulcrumed on the ears 25 and secured to the underside of the floor 26 of the automobile and which carries a foot-piece 27. It has a pedal 28 which coöperates with the stationary rack 29, whereby the pedal lever can be locked in position to hold the pawl 18 out of engagement with the ratchet wheel. The link 20 and cable 22 pass through an opening 30 in the dash-board. The pedal 28 also holds the pawl 31 out of engagement with the ratchet wheel by means of the link 32 and cable 33, which are arranged similar to the link 20 and cable 22. The pawl 31 is pivoted to the stationary bracket 34 secured to the frame bar 35, see Fig. 1.

During normal operation of the machine, the pawls 18 and 31 are held out of engagement with the ratchet wheel by the pedal mechanism just described. When it is desired to start the automobile the pedal 28 is released, and then the pawls 18 and 31 return to the engaging position, and the pawl 18 is actuated through the lever 40 and intermediate means.

The lever 40 is fulcrumed by the pin 41 to the side bar 42 of the frame and running along the side of the automobile. It is fulcrumed between its ends and its lower end is connected with the cable 43 that passes over a pulley 44 in the bracket 45 connected with the bar 42, and said cable runs to the pulley 50 mounted on a bracket 51 secured to the side bar 42 of the frame, and up to the bell crank 16. For this purpose the pulley 50 is merely located as nearly under the end of the bell crank 16 as possible so as to get almost a straight pull.

When the lever 40 is drawn rearwardly, the bell crank 16 is actuated and the pawl 18 gives the fly-wheel a partial revolution. The movement of the lever 40 is thus repeated until the desired movement of the fly wheel and engine shaft is obtained that will cause the engine to start. Then the pedal 28 is operated and the two pawls 18 and 31 locked out of engagement with the ratchet wheel.

What I claim as my invention and desire to secure by Letters Patent is:

1. In an automobile, the combination with an engine, an engine shaft, and a fly wheel adapted to actuate said shaft, of an annular ratchet on the side of the fly wheel, a bell crank lever mounted beside said ratchet, a pawl pivoted to one arm of the bell crank and adapted to engage the ratchet, means connected with the other arm of the lever for actuating it, a spring for returning said lever and pawl to their normal positions, and a pawl for engaging the ratchet and preventing backward movement thereof, substantially as set forth.

2. In an automobile, the combination with an engine, an engine shaft, and a fly wheel adapted to actuate said shaft, of an annular ratchet in fixed relation to said fly wheel, a bell crank lever mounted beside said ratchet, a pawl pivoted to one arm of the bell crank and adapted to engage the ratchet, means connected with the other arm of the lever for actuating it, a spring for returning said lever and pawl to their normal positions, and means for holding both of said pawls out of engagement with the ratchet during the normal operation of the machine.

3. In an automobile, the combination with an engine, an engine shaft, and fly-wheel on said shaft, of an annular ratchet on the side of said fly-wheel, means for engaging said ratchet to give the same a rotary movement, a pawl for engaging the ratchet and preventing its backward movement, a pedal, a connection between said pedal and said ratchet actuating means and pawl, whereby the latter may be disengaged from the ratchet, and means for locking said pedal in position to hold said pawl and actuating means out of engagement with the ratchet during normal operation of the machine.

4. In an automobile, the combination with an engine, an engine shaft, and fly-wheel on said shaft, of an annular ratchet on the side of said fly-wheel, a bell crank mounted near said ratchet, a pawl pivoted on one arm thereof and as long as said arm of the lever for engaging the ratchet and actuating it, a hand lever fulcrumed at the side of the automobile, and connections between said hand lever and the other arm of said bell crank for actuating the latter.

5. In an automobile, the combination with an engine, an engine shaft, and fly-wheel on said shaft, of an annular ratchet on the side of said fly-wheel, a bell crank mounted beside said ratchet, a pawl pivoted on one arm thereof and as long as said lever arm for engaging the ratchet and actuating it, a hand lever fulcrumed at the side of the frame of the machine and between the ends of said lever, a cable connected with the lower end of said lever, a pulley mounted at the rear of said lever over which said cable passes, another pulley located near the other arm of said bell crank lever and about which said cable passes and a connection between the forward end of said cable and the last mentioned arm of said bell crank.

In witness whereof, I have hereunto affixed my signature in the presence of the witnesses herein named.

GEORGE BURESS.

Witnesses:
G. H. BOINK,
O. M. McLAUGHLIN.

Copies of this patent may be obtained for five cents each, by addressing the "Commissioner of Patents, Washington, D. C."